Jan. 2, 1940. A. G. GERDES 2,185,550
AUTOMOBILE REPAIR TOOL
Filed Feb. 25, 1938
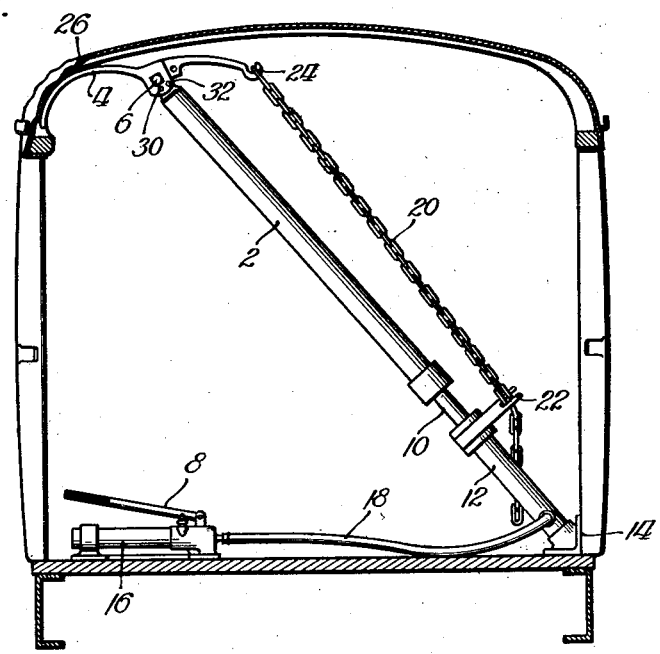
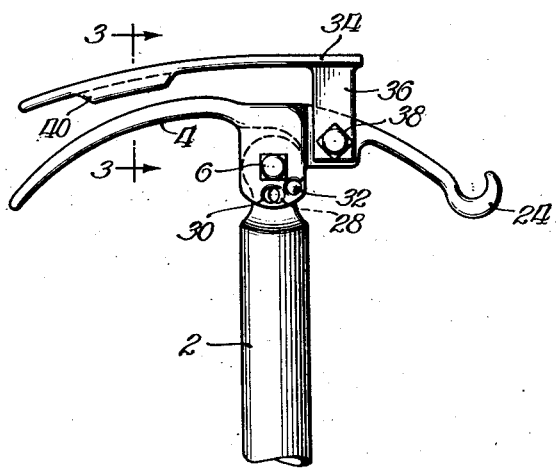
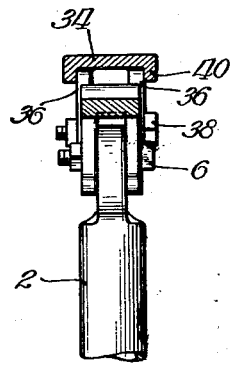
Inventor:
August G. Gerdes
By: Richard Spencer
Atty.

Patented Jan. 2, 1940

2,185,550

UNITED STATES PATENT OFFICE 2,185,550

AUTOMOBILE REPAIR TOOL

August G. Gerdes, Clinton, Iowa

Application February 25, 1938, Serial No. 192,443

2 Claims. (Cl. 153—48)

This invention relates to an automobile repair tool and more particularly to an adjustable tool for reshaping automobile bodies.

When present day automobiles become dented around the sides and top it is difficult to repair and reshape body structures without cutting, bending or removing drip spouts and other portions of the car. This is particularly true where it is necessary to remove dents from metal automobile tops. Nearly all of the automobiles manufactured today have a drip ledge around the top of the automobile and if the top becomes dented near this ledge, as it usually does in automobile accidents where the car is overturned, it is difficult to reshape the top near the drip ledge without bending, cutting, or removing the ledge, all of which requires time and adds to the expense of repair.

One of the objects of the present invention is the provision of a new and improved type of adjustable repair tool which makes it possible to straighten the steel tops of automobiles without cutting, bending or removing drip ledges or reinforcing members.

Another object is to provide a new and improved type of tool for repairing bodies and particularly steel tops of automobiles which is simple in construction and easy to use.

Other objects will appear as the description proceeds.

In accordance with this invention I provide an adjustable tool adapted to be used in conjunction with a jack and which comprises a curved or spoon-like movable rigid member mounted on another rigid member, which in turn is adapted to be associated with a jack. According to the invention, means are provided for causing the curved movable rigid member to move in an arcuate path around a fulcrum and thereby impart a pushing and smoothing action to any portion of an automobile to which it is applied. The same tool may be used to impart a pulling action to a portion of the automobile to be reshaped, as more fully hereinafter described.

Other features and advantages of the invention will become apparent from a reading of the following specification in the light of the accompanying drawing in which:

Fig. 1 represents a cross sectional view of an automobile with my repair tool and a jack mounted therein to illustrate one way of reshaping a steel automobile top at a point near the drip ledge;

Fig. 2 is a side elevational view of the repair tool itself with parts broken away showing also an auxiliary tool which may be used in conjunction therewith; and Fig. 3 is a cross sectional view through Fig. 2 along the line 3—3.

Referring to Fig. 1 the repair tool shown consists of a rigid member 2 on which is mounted a movable curved member 4. Curved member 4 is movable around fulcrum 6 which consists of a bolt and nut extending through holes in members 2 and 4, as more fully illustrated in Fig. 3. Rigid member 2 is associated with a jack 8 which is generally illustrated in the lower part of Fig. 1. As shown, jack 8 is a hydraulic type of jack, although any other type of jack may be employed, and consists of a movable member 10 which is associated with member 2, a stationary member 12, which is supported against the side of the car or other vehicle at point 14 and means for forcing member 10 upwardly. As illustrated, member 10 is forced upwardly by fluid pressure means supplied from a suitable source 16 through a conduit or line 18.

A chain 20 or other suitable means is connected between stationary portion 22 of the jack and hook 24 in curved member 4.

The operation of my new adjustable repair tool is as follows: As member 2 is forced outwardly by the movable portion 10 of jack 8, movable member 4 moves outwardly and upwardly in a generally arcuate path around fulcrum 6. When movable member 4 is placed against a dented portion 26 of an automobile, as shown in Fig. 1, the outward and upward motion imparts a pushing and smoothing action to the top of the automobile and removes the dents. Should it be desired to hold the movable member 4 in a fixed position and hammer or otherwise apply pressure to the exterior of the automobile top, I find it convenient to lock movable member 4 in position by inserting a bolt or other suitable means through holes running through said movable member 4 and through rigid member 2 near fulcrum 6.

As shown in Fig. 2, locking of movable member 4 in a definite position may be accomplished by providing a hole 28 in rigid member 2 and one or more holes 30 and 32 in movable member 4. It will be apparent that a series of holes may be provided to lock movable member 4 in different positions.

Inasmuch as it is very often desirable to hammer or otherwise apply pressure from the outside and in order to provide for changes in curvature of different portions of the automobile top I sometimes employ an auxiliary tool 34 in association with curve member 4, as shown in Fig. 2. Auxiliary tool 34 is a rigid metal member of less curvature than member 4 and is fastened to member 4 through an integral portion 36 held in place by means of bolt and nut 38 or other suitable means. A close fitting relationship between member 34 and member 4 is provided by means of flanges 40 in member 34. These flanges likewise prevent substantial lateral movement of member 34 with respect to member 4.

While member 34 is shown separated from member 4 in the drawing, it will be understood that this is for the purpose of illustration only, because when member 34 is used on the repair tool, as previously described, the two members are ordinarily closely associated in proximity to the flanged portion 40. This flanged portion 40 of member 34, as previously indicated, is adapted to fit over the sides of member 4.

In the mode of operation described above the working action of the repair tool is more or less a pushing and smoothing action, that is, the curved surface of the tool tends to move outwardly and upwardly in a curved path. As it moves outwardly it pushes against the metal body or top portions of the automobile being reshaped and as it moves upwardly it tends to smooth said portions.

If substantially solely a pushing or a pulling movement is desired, chain 20 may be omitted and the working surface locked in position by means of bolts inserted through holes 28, 30 or 28, 32 (Fig. 2). As member 10 of the jack moves it will then impart a pushing or pulling motion to member 4 of the repair tool while the relationship between members 2 and 4 remains fixed. The repair tool may be made adjustable to a greater extent by providing more holes in member 4 adjacent holes 30 and 32. For most purposes it is desirable to carry out the reshaping operation in the manner previously described in connection with the drawing whereby the position of member 4 is constantly changing with respect to member 2.

It will be apparent that changes may be made in the apparatus described without departing from the invention. The shape of the outer surface of movable member 4 may be varied. If desired the entire outer surface may lie in an arc of the same circle. Alternatively, only the working portion of member 4 need be curved, the opposite portion being substantially straight. The design shown in the drawing is usually preferred because hook 24 does not interfere in any way with the working or reshaping portion of member 4. Other means besides hook 24 may be provided for holding the non-working portion of member 4 against substantial upward movement. Steel or other suitable materials of construction may be employed in making repair tools of the character described.

Having thus described the invention, what I claim as new and desire to secure by Letters Patent of the United States is:

1. An apparatus for repairing dents in automobile bodies, comprising, in combination with a jack having a stationary portion and an outwardly movable member, a repair tool having a rigid supporting member connected at one end in fixed relationship with the outwardly movable member of the jack, an elongated working member mounted on the other end of said supporting member, said working member comprising a curved working surface in proximity to one end thereof and being mounted upon a fulcrum near a central portion thereof in a manner such that said working member is normally at an angle to said supporting member and is adapted to move in a curved path around said fulcrum, and means connecting the other end of said working member with the stationary portion of the jack.

2. A device for repairing dents in automobile bodies and automobile tops, comprising, for use in combination with a jack having a stationary portion and an outwardly moving member, a repair tool having a rigid supporting member adapted to be connected at one end in fixed relationship with the outwardly movable member of the jack, an elongated working member mounted on the other end of said supporting member, said working member comprising a curved working surface in proximity to one end thereof and being mounted upon a fulcrum near the central portion thereof in a manner such that said working member is normally at an angle to said supporting member and is adapted to move in a curved path around said fulcrum and means for connecting the other end of said working member with the stationary portion of the jack.

AUGUST G. GERDES.